(12) United States Patent
Stodolka

(10) Patent No.: US 6,981,567 B2
(45) Date of Patent: Jan. 3, 2006

(54) MUFFLER SUPPORT DEVICE

(76) Inventor: John T Stodolka, 13843 Guild Ave., Apple Valley, MN (US) 55124

( * ) Notice: Subject to any disclaimer, the term of this patent is extended or adjusted under 35 U.S.C. 154(b) by 0 days.

(21) Appl. No.: 10/261,204

(22) Filed: Oct. 1, 2002

(65) Prior Publication Data

US 2004/0060763 A1 Apr. 1, 2004

(51) Int. Cl.
B60K 13/04 (2006.01)

(52) U.S. Cl. .................... 180/309; 180/296; 248/58; 248/59

(58) Field of Classification Search ............... 180/309, 180/296, 89.2; 248/58, 59, 60, 62, 65, 200, 248/610, 74.3, 205.1, 589, 593
See application file for complete search history.

(56) References Cited

U.S. PATENT DOCUMENTS

| | | | | | |
|---|---|---|---|---|---|
| 285,748 | A | * | 9/1883 | Gulick | 248/59 |
| 3,261,579 | A | * | 7/1966 | Engman et al. | 248/60 |
| 3,289,984 | A | * | 12/1966 | Clemons et al. | 248/60 |
| 3,316,605 | A | * | 5/1967 | Tabbert | 248/60 |
| 3,565,375 | A | * | 2/1971 | Babb | 248/59 |
| 3,960,232 | A | * | 6/1976 | Hubbell, III | 180/309 |
| 4,004,768 | A | * | 1/1977 | Evans et al. | 248/59 |
| 4,309,019 | A | * | 1/1982 | Bloom | 248/610 |
| 4,413,799 | A | * | 11/1983 | Gabriel | 248/59 |
| 4,638,965 | A | * | 1/1987 | De Bruine et al. | 248/59 |
| 4,730,800 | A | * | 3/1988 | Engman | 248/67 |
| 4,988,070 | A | * | 1/1991 | Hollinger et al. | 248/613 |
| 5,570,861 | A | * | 11/1996 | Olsen et al. | 180/296 |
| 6,095,460 | A | * | 8/2000 | Mercer et al. | 248/59 |

* cited by examiner

Primary Examiner—Brian L. Johnson
Assistant Examiner—Hau Phan
(74) Attorney, Agent, or Firm—Herman H Bains

(57) ABSTRACT

A muffler suspension kit for use in attaching a replacement or original catalytic converter, or exhaust pipe muffler to a vehicle includes a flexible clamping band formed of stainless or regular steel. The clamping band extends around a replacement muffler and clamps an angle-shaped suspension bracket against a muffler. The suspension bracket has a plurality of apertures therein for connection to one or more elongate, longitudinally, adjustable J-hooks. The J-hooks are connected to grommets on the vehicle for attaching the muffler to the vehicle. The selective position of attachment of the J-hooks to the suspension bracket and the longitudinal adjustability of the J-hooks provides a wide range of adjustment when attaching a muffler to a vehicle.

10 Claims, 1 Drawing Sheet

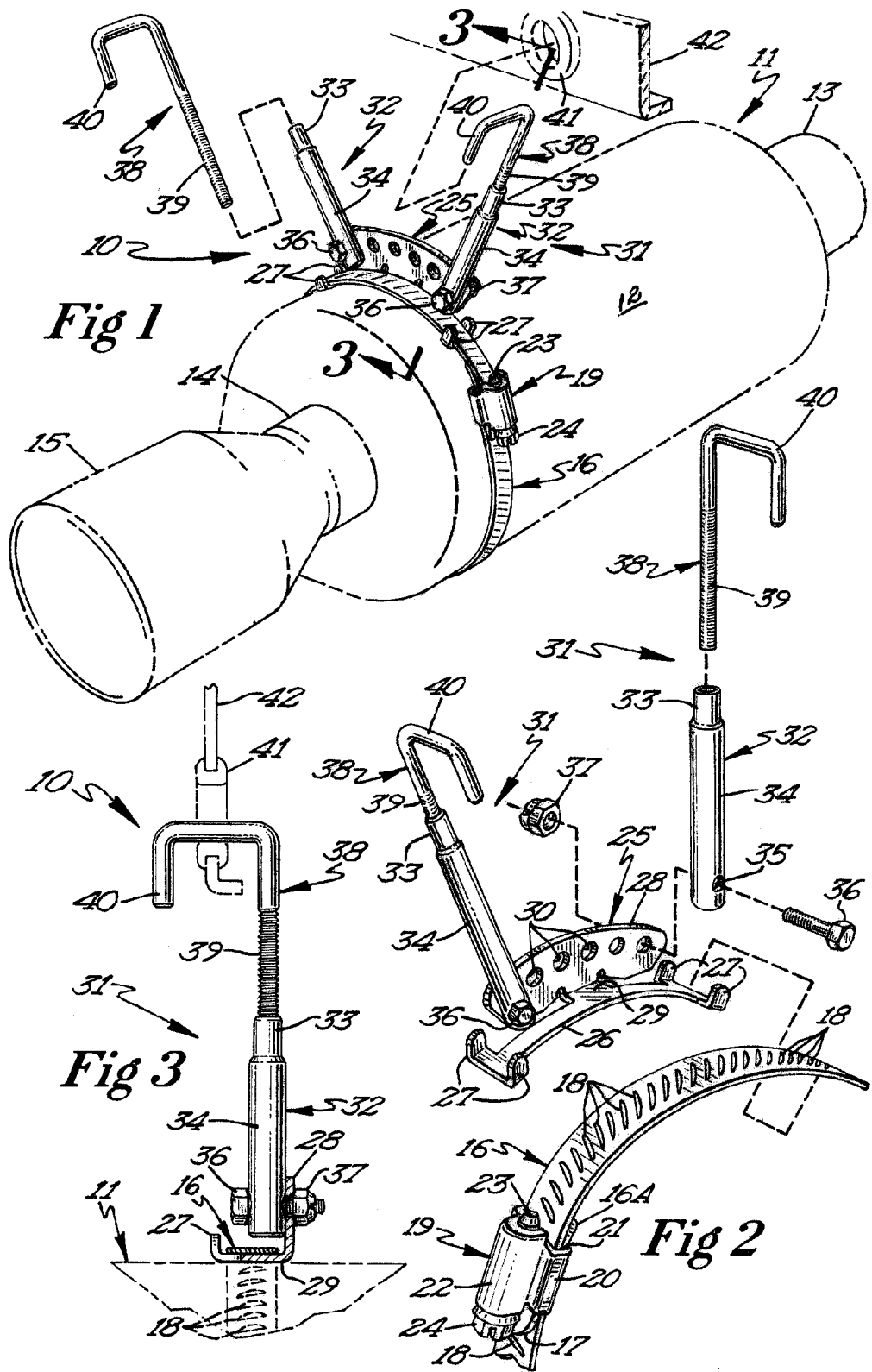

MUFFLER SUPPORT DEVICE

FIELD OF THE INVENTION

This invention relates to a suspension kit for readily and effectively mounting a muffler, catalytic converter, or exhaust pipe on a vehicle.

BACKGROUND OF THE INVENTION

Replacement of mufflers is usually a time consuming operation even when done by specialists (muffler shop). Installation of a new muffler under conventional practices usually involves welding the suspension mechanism to the muffler body. When a stainless steel muffler (usually selected for aesthetic purposes) is installed, steel is welded to stainless steel which impairs the appearance of the muffler. The spacing between the muffler and vehicle frame often results in frustrating adjustments.

SUMMARY OF THE INVENTION

An object of this invention is to provide a muffler suspension kit which allows rapid and efficient installation of mufflers.

The muffler suspension kit includes an elongate stainless steel flexible band which is tightened around the body of a muffler to be installed. The band clamps a suspension bracket to muffler. The suspension bracket is also formed of stainless steel and accommodates one or more (usually two) J-bolts for attachment to vehicle grommets or frame. The J-bolts are longitudinally adjustable and can be selectively positioned relative to the suspension bracket thereby allowing a wide range of adjustments. Although it is preferable to form certain components of the kit of stainless steel, it is pointed out that metals including regular steel may be used.

BRIEF DESCRIPTION OF THE FIGURES OF THE DRAWINGS

FIG. 1 is a perspective view of the novel muffler suspension kit applied to a muffler which is shown in phantom line configuration;

FIG. 2 is a partial exploded perspective view of the muffler suspension kit, and FIG. 3 is a cross-sectional view taken approximately along line 3—3 of FIG. 1 and looking in the direction of the arrows.

DESCRIPTION OF THE PREFERRED EMBODIMENT

Referring now to the drawings and more particularly to FIG. 1, it will be seen that one embodiment of my novel muffler suspension kit 10 is shown applied to a muffler body 12 of a muffler 11. The muffler 11 also includes an exhaust pipe connector 13 which is connected to the exhaust pipe and a tail pipe connector 14 connected to the tail pipe 15. In the embodiment shown, the muffler is of stainless steel construction and somewhat showy in appearance. Some purchasers of replacement mufflers prefer stainless steel mufflers for enhancing the appearance of the vehicle. However, the muffler suspension kit works equally well with other style mufflers. The suspension kit may be used with original equipment (mufflers, catalytic converters and exhaust pipes) especially if the original equipment is undamaged.

The muffler suspension kit 10 includes an elongate substantially flat, flexible clamping band 16 formed of a rigid metal, preferably stainless steel or regular steel. The band 16 is clamped around the body 12 of the muffler tightened there against by a tightening mechanism 19. The ends of the band are passed through the opening 21 of a flat body 20 of the tightening mechanism 19 and these ends of the clamping band are disposed in overlapped relation. One end portion 17 of the band has plurality of transversely extending openings 18 therein (FIG. 2) that function as teeth. The other end portion 16a of the band 16 is anchored to the flat body 20.

The tightening mechanism 19 includes an internally threaded housing member 22 secured to the body portion 20. A worm or bolt 23 threadedly engages the internal threads of housing member 22 and also engages the slots or openings 18 in the clamping band 16. The worm 23 is provided with a slotted head 24 for facilitating turning or rotation of the worm. It will be seen that turning the worm 23 will progressively tighten the band 16 against the muffler body 12 during installation of a muffler.

The clamping band 16 clamps a one-piece suspension bracket 25 against the upper surface of the muffler body 12. The suspension bracket 25 is formed of stainless steel and includes an elongate, substantially flat, flexible muffler engaging member 26. Each end of the muffler engaging member is provided with an opposed pair of retaining ears 27.

The bracket 25 also includes an arcuate hook engaging member 28 which is integrally connected with the muffler engaging member 26 by an attachment portion 29. The hook engaging member 28 extends angularly from the muffler engaging member 26. In the preferred embodiment, the hook engaging member 28 and muffler engaging member 25 are disposed in right angular relation. The hook engaging member 28 is provided with spaced apart apertures 30 therein. These apertures are arranged in an arcuate pattern.

When the clamping band 16 is applied to a muffler 11, the clamping band will engage the muffler engaging member 26 and clamp the member 26 against the upper surface of the muffler body. Because of its flexibility, the flat muffler engaging member will conform to the contour of the muffler body 12.

The openings 30 in the hook engaging member 28 serve as attachment means for suspension members or J-hooks 38. In the embodiment shown, two J-hooks are used to suspend the muffler from the car frame although this number may vary. The J-hooks are longitudinally adjustable and each includes an elongate tubular element 31 having a diametrically reduced upper, end portion 33 which is internally threaded. The lower end portion of the hollow tubular element 31 has an opening 35 extending diametrically there through.

A bolt 36 and nut 37 are used to secure each J-bolt to the hook engaging member 28. It is pointed out that each nut 37 has a slightly non-round threaded opening there through and slightly deforms when the screw 36 is threaded into the nut. This slight deformation produces a locking effect making removal of the screw very difficult.

Each J-hook 31 includes upper end element 38 including a straight threaded portion 39 which threadedly engages tubular element 32. The upper end element 38 also includes J-shaped end upper end portion 40 which engages a grommet 41 attached to the vehicle frame 42. When the suspension kit 10 is attached to the muffler 11 via the clamping band 16 and secured to the grommets 41 by the J-hooks, the muffler will be securely and effectively suspended from the vehicle. However, the J-hooks may also be directly connected to the frame as by welding.

It will be seen that the suspension kit 10 may be readily applied to a muffler by simply clamping the suspension bracket 25 to the muffler body by means of the clamping band 16. The stainless steel clamping band 16, is hardly discernible against a stainless steel muffler body. Of course, the band 16 will be readily noticeable against a non-stainless steel muffler. The clamping band obviates the need for welding used in conventional practices.

The J-hooks may be selectively applied to the suspension bracket in a number of angular positions. This selective positioning allows the suspension kit to engage most, if not all, grommets regardless of their positions relative to the muffler when it is attached to the exhaust pipe. The J-hooks are also longitudinally adjustable by simply threading the upper end element relative to the tubular element 32. When the upper end element 38 is threaded into the tubular element 32, the effective length of a J-hook will be shortened. Contrarily, when the upper end element is turned in the opposite direction, the effective length of the J-hook will be lengthened.

The longitudinal adjustment of the J-hooks allows the suspension kit to be applied to vehicle grommets regardless of the spacing between the grommets and the muffler body. In the embodiment shown, the J-hooks may be adjusted to have an effective length including a linear size of less than an inch to one having a length of twelve (12) or more inches. In many applications, the effective length of the J-hooks will vary between two (2) and six (6) inches. The capability of the angular and longitudinal adjustment of the J-hooks allows attachment of mufflers to almost any vehicle. It is also pointed out that the kit may also be used to support catalytic converters or exhaust pipes.

Thus it will be seen that suspension kit 10 may be readily applied to replacement mufflers of vehicles with a minimum of effort. The ease in which the suspension kit is used to attach a replacement muffler to a vehicle makes the suspension kit especially attractive to muffler shops and service departments as well as individual do-it-yourself users.

What is claimed is:

1. A suspension kit for engaging and suspending a stainless steel muffler, catalytic converter or exhaust pipe, for a vehicle,
   a stainless steel suspension bracket,
   an elongate stainless steel clamping band for engaging and clamping the suspension bracket against a muffler, catalytic converter, or exhaust pipe,
   and longitudinally adjustable suspension means including an elongate internally threaded stainless steel tubular member attached to the suspension bracket, and an elongate threaded stainless steel J-bolt threadedly engaging the elongate tubular member and engaging the vehicle for attaching the muffler, catalytic converter, or exhaust pipe to the vehicle.

2. A muffler suspension kit for engaging and suspending a muffler from a vehicle having grommets on the vehicle frame, comprising
   a suspension bracket,
   an elongate flexible clamping band for engaging and clamping the suspension bracket against a muffler,
   said suspension bracket having a plurality of spaced apart hook attachment means,
   a plurality of longitudinally adjustable, elongate J-hooks, means for selectively attaching one end of each J-hook to one of the attachments means of said suspension bracket,
the other end of each J-hook being adapted for connecting to a grommet on the vehicle for attaching the muffler to the vehicle.

3. The muffler suspension kit as defined in claim 2 wherein the attachment means on the suspension bracket comprises a hook engaging member having a plurality of spaced apart apertures therein.

4. The muffler suspension kit as defined in claim 3 wherein said apertures in the hook engaging member are arranged in arcuate configuration.

5. The muffler suspension kit defined in claim 2 wherein each J-hook includes upper and lower elements threadedly engaging each other whereby the overall length of each J-hook maybe readily adjusted.

6. The muffler suspension kit as defined in claim 5 wherein said upper element of each J-hook is a J-shaped configuration having a lower threaded end portion, said lower element of each J-hook is of internally threaded tubular configuration for threaded engagement with the threaded lower end portion of the upper element.

7. The muffler suspension kit as defined in claim 2 wherein said suspension bracket includes an elongated muffler engaging member for engaging the surface of a muffler, a hook engaging member integral with said muffler engaging member and extending angularly there from, said hook engaging member having a plurality of spaced apart apertures therein arranged in arcuate configuration, means attaching said one end of each J-hook to one of said apertures.

8. The muffler suspension kit as defined in claim 7 wherein said muffler engaging member of said suspension bracket has opposed pairs of retaining ears at each end thereof, said clamping band engaging the muffler engaging member and being positioned between said retaining ears when said clamping band clamps the suspension bracket against a muffler.

9. The muffler suspension kit as defined in claim 2 wherein said clamping band has a length dimension sufficient for extending around a muffler, adjustable means engaging the ends of said clamping band for adjustably tightening the band against a muffler.

10. The muffler suspension kit as defined in claim 9 wherein one end of said clamping band has a plurality of longitudinally spaced apart openings therein, said adjustable band engaging means including a threaded member engaging the openings for progressively tightening the band against a muffler.

\* \* \* \* \*